United States Patent
Cheng et al.

(10) Patent No.: US 7,613,400 B2
(45) Date of Patent: Nov. 3, 2009

(54) MULTI-LEVEL OPTICAL DATA COMMUNICATION CIRCUIT

(75) Inventors: Hengju Cheng, Mountain View, CA (US); Peter Kirkpatrick, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 11/480,671

(22) Filed: Jun. 30, 2006

(65) Prior Publication Data

US 2008/0002988 A1    Jan. 3, 2008

(51) Int. Cl.
*H04B 10/04* (2006.01)

(52) U.S. Cl. .................. 398/186; 398/182; 398/183; 398/192; 398/193; 398/196; 398/197; 398/198; 375/286; 375/287; 375/316; 375/317; 372/32; 372/34; 372/36; 372/38.02; 385/88; 385/89; 385/92; 385/93

(58) Field of Classification Search ............... 398/182, 398/183, 79, 202, 208, 209, 186, 189, 190, 398/191, 192, 193, 194, 185, 187, 188, 195, 398/196, 197, 198, 199, 200, 201, 135, 128, 398/130, 136, 138; 375/286, 287, 316, 317; 372/32, 34, 36, 38; 385/88, 89, 90, 92, 93
See application file for complete search history.

(56) References Cited

U.S. PATENT DOCUMENTS

| | | | | |
|---|---|---|---|---|
| 2002/0167693 | A1* | 11/2002 | Vrazel et al. | 359/109 |
| 2003/0030873 | A1* | 2/2003 | Hietala et al. | 359/181 |
| 2003/0223762 | A1* | 12/2003 | Ho et al. | 398/186 |

OTHER PUBLICATIONS

David Cunningham, "Multilevel Modulation for 10GbE: Link and Component Specification Issues", IEEE 802.3 High Speed Study Group Jul. 1999 Plenary Week Meeting, Jul. 6-7, 1999, Montreal, PQ (19 pages).

* cited by examiner

*Primary Examiner*—Hanh Phan
(74) *Attorney, Agent, or Firm*—Blakely, Sokoloff, Taylor & Zafman LLP

(57) ABSTRACT

A driver circuit is coupled to an optical waveguide transmitter. The driver circuit has a current generator that is in series with the transmitter, and a current robbing circuit is coupled to the transmitter. The current robbing circuit is to divert first and second amounts of current from the transmitter, in accordance with predetermined values of first and second bit streams, respectively, in which data is received to be transmitted. Other embodiments are also described and claimed.

10 Claims, 4 Drawing Sheets

MULTI-LEVEL OPTICAL DATA COMMUNICATION CIRCUIT

FIELD

An embodiment of the invention is directed to transmitter and receiver circuits for light waveguide data communications over relatively short distance links. Other embodiments are also described.

BACKGROUND

Light waveguide data communications (also referred to here as optical data communications) is becoming increasingly popular due to its advantages in relation to systems that use conductive wires for transmission. Such advantages include resistance against radio frequency interference and higher data rates. An example of a light waveguide transmission system is an optical fiber cable link. Such links are widely used for high speed communications between computer systems. Each system that is attached to the link has a transmitter portion and a receiver portion. The transmitter portion includes electronic circuitry that controls a light source such as a laser, to generate a light signal in the cable that is modulated with information and/or data to be transmitted. The light signal is detected at the receiver portion by a light detector, such as a photodiode, and with the help of appropriate circuitry the received data is then demodulated and recovered.

The transmitter and receiver portions of an optical link are designed with the concept of an optical power budget in mind. The required power or light intensity of the source signal at the transmitter is a function of not just the dynamic range of the receiver, but also connector losses and fiber attenuation. Enough power should reach the receiver such that the signal to noise ratio (SNR) is adequate to achieve a minimum bit error ratio (BER). In other words, the transmit power needs to be high enough so that despite such losses, there is enough signal power at the receiver to detect the transmitted information. The higher the losses in the link, the smaller the available light intensity range in which the data to be transmitted can be modulated or encoded. In addition, optical fiber cable causes dispersion in the light signal, making it difficult for the receiver to distinguish between adjacent data symbols in a received sequence. The data symbols are conventionally encoded using a binary coding scheme where each symbol that is transmitted is represented by one of only two different light intensity levels.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment or "one" embodiment of the invention in this disclosure are not necessarily to the same embodiment, and they mean at least one.

DETAILED DESCRIPTION

Figure 1:
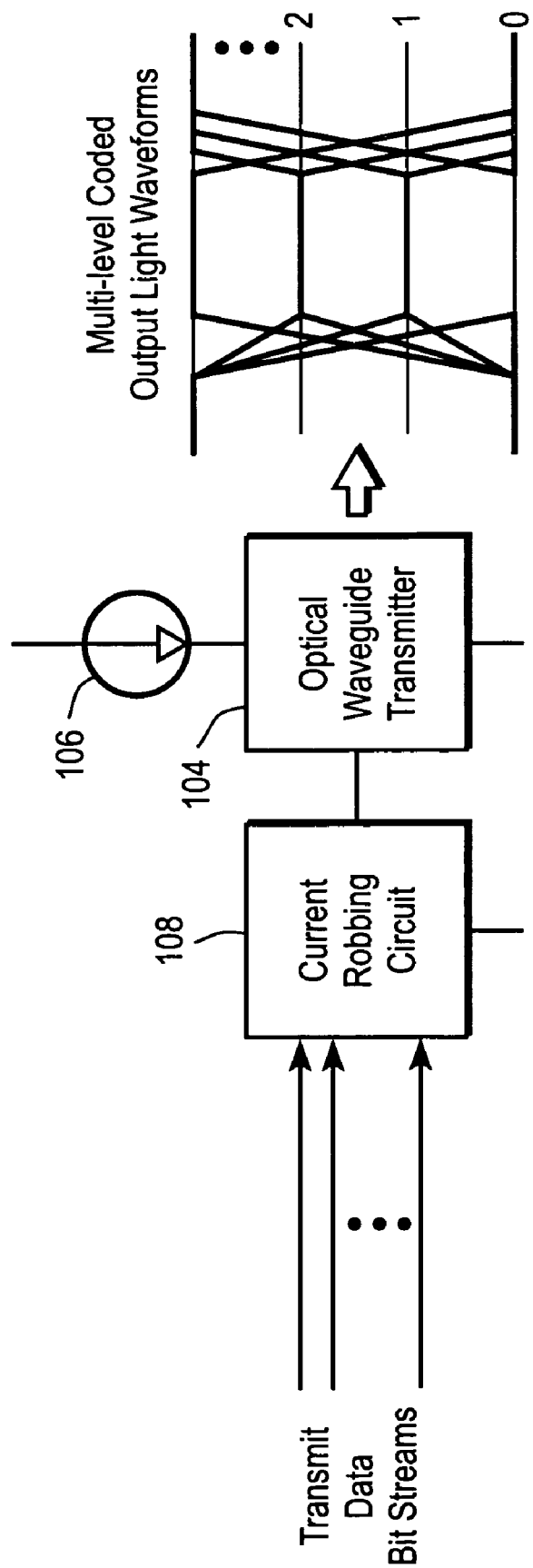
FIG. 1 is a conceptual block diagram of multi-level coding circuitry for optical links, in accordance with an embodiment of the invention.

The various embodiments of the invention described here encompass a multi-level coding scheme, i.e. more than two levels for representing each transmitted symbol, which makes more efficient use of the power budget of an optical link. FIG. 1 shows a block diagram of multi-level coding circuitry at the transmitter end, in accordance with an embodiment of the invention. An optical waveguide transmitter 104 is coupled to a driver circuit. The driver circuit includes a current generator 106 in series with the transmitter 104 as shown, and a current robbing circuit 108. The current produced by the generator 106 causes the transmitter 104 to generate an output light waveform or light signal suitable for being transmitted in a light waveguide (e.g., an optical fiber cable). The resulting output light waveform is multi-level coded (as illustrated by its eye opening diagram in FIG. 1) by the current robbing circuit 108. The current robbing circuit 108 diverts several amounts of current from the transmitter 104, in accordance with predetermined values of two or more bit streams, respectively, that contain the information to be transmitted. The intensity of the output light signal generated by the transmitter 104 is changed from one predetermined level to another, in response to the current robbing circuit 108 diverting a set amount of current from the transmitter 104. For instance, if each bit stream is a binary bit stream in which a sequence of "0" and "1" logic values are received, then the current robbing circuit 108 either diverts a first amount of current, or does not divert the first amount, depending upon the present logic value encountered in the bit stream.

With at least two binary bit streams delivering the information to be transmitted, each transmitted symbol can be represented by a single one of at least four different current levels in the transmitter 104. Note that the driver circuit can receive further transmit data, in additional bit streams. In that case, the current robbing circuit 108 will be able to divert additional amounts of current from the transmitter 104, in accordance with predetermined values of those further bit streams. This allows the multi-level coding circuitry to be easily scaled to coding schemes that have a greater number of levels.

The multi-level coding scheme described here makes more efficient use of optical data communication signals, thereby helping reduce power consumption. For instance, although the per-channel power may be similar to that of a binary coded link, in the case of a pulse amplitude modulation (PAM) PAM-4 level coding, the data rate is doubled. Thus, the effective power per binary bit that is transmitted is actually reduced. In addition, with multi-level coding, the resulting optical channel has higher information spectral density, thereby reducing the needed channel count in a large communication network.

The multi-level coding scheme described here, may be particularly advantageous when used in relatively short distance optical links in which the optical power budget is relaxed, in relation to longer distance optical links. With short distance optical links, such as those made of present technology multi-mode optical fiber cables that can run without a repeater for up to about 100 meters, fiber attenuation and distortion is greatly reduced. This increases the portion of the link signal to noise budget which can be allocated to support the reduced eye opening that is present with multi-level coding.

Figure 2:
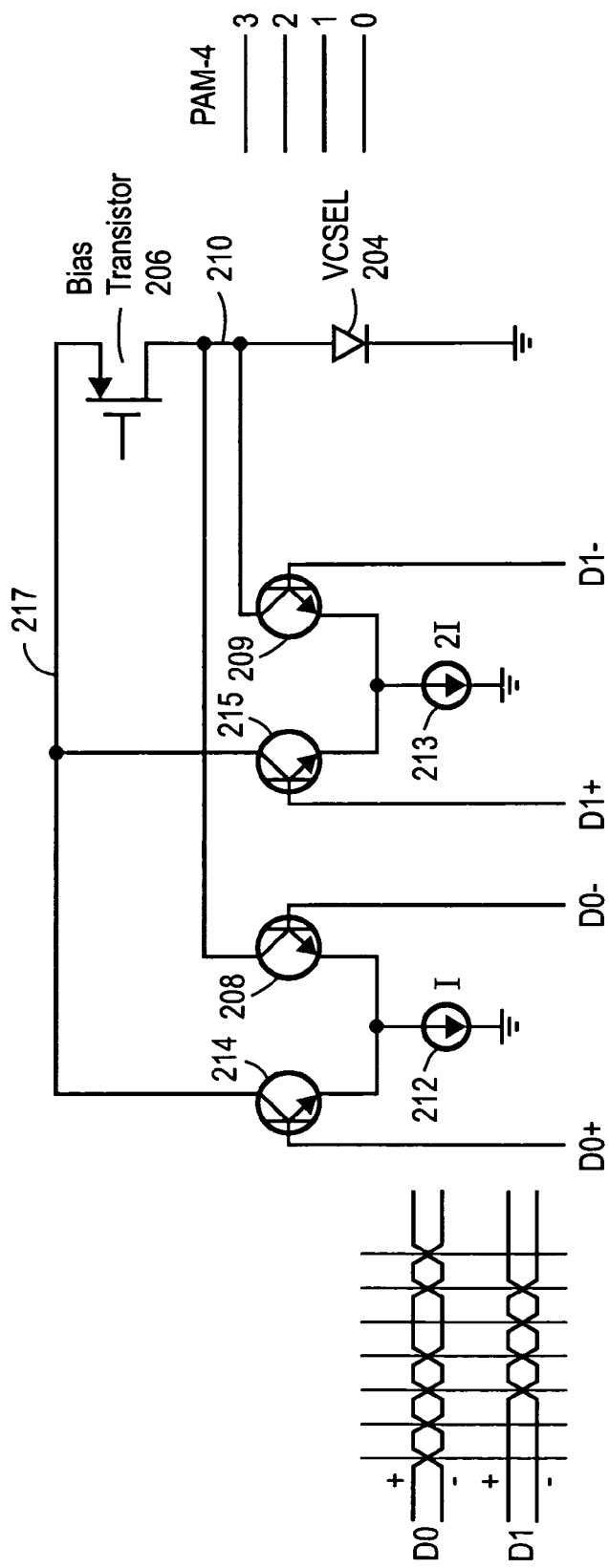
FIG. 2 is a schematic diagram of example multi-level transmitter circuitry for an optical link.

Turning now to FIG. 2, a schematic diagram of example multi-level coding circuitry at the transmitter end of an optical link is shown. This is a particularly compact circuit, with relatively few optical components. The optical waveguide transmitter includes a particular type of directly modulated laser, namely a vertical cavity surface emitting laser (VCSEL) 204. Other types of directly modulated light sources may be substituted, such as distributed feedback (DFB) edge emitting lasers and Fabry-Perot lasers. The driver circuit is DC-coupled to the VCSEL 204. The current that drives the laser is set by, in this example, a single bias transistor 206, which sets a baseline amount of current through the VCSEL 204 that determines the highest level of light output. Other ways of generating the baseline current are possible.

The bias transistor 206 may be biased to a DC level that maintains a constant current through the VCSEL 204, until some of that current is diverted by one or more of the two transistors 208, 209. The transistors 208, 209 divert current from the same node 210 that receives the current generated by the bias transistor 206. Whenever the value of the binary signal D0− is in a predetermined, high range, the transistor 208 diverts an amount, I, of current from node 210. Similarly, a second amount of current, 2I, is diverted by transistor 209, whenever the value of the binary signal D1− is in the predetermined, high range. In this embodiment, the signals D0−, D1− are the complementary branches of separate and generally independent differential signals (D0, D1) that contain separate binary bit streams (see the example waveforms for D0 and D1 in FIG. 2). The transistors 208, 209 thus operate as switches, under the control of the D0, D1 signals.

The respective amounts of current that are diverted by the transistors 208, 209 are different and fixed by current generators 212, 213. An additional pair of transistors 214, 215 (that also operate as switches) are provided to ensure that the currents through the generators 212, 213 are maintained at all times, regardless of the logic values that appear in the signals D0, D1. These are controlled by D0+, D1+ (complements of D0−, D1−). In other words, the current I through generator 212 is maintained, by being sourced from node 210 of the VCSEL 204, or from another node 217. The latter may be connected directly to a power supply rail, typically indicated as VCC or VDD.

In the embodiment of the invention shown in FIG. 2, the separate differential signals D0 and D1 are controlling the diversion of different amounts of current, namely I and 2I. Assuming, for the purposes of just an example, that the bias transistor 206 sources a fixed current in the amount of 5I into node 210, the circuit depicted in FIG. 2 has the following truth table:

| D0+ | D0− | D1+ | D1− | VCSEL Current (× I) | External Current (× I) |
|-----|-----|-----|-----|---------------------|------------------------|
| 1   | 0   | 1   | 0   | 5                   | 3                      |
| 0   | 1   | 0   | 1   | 2                   | 3                      |
| 1   | 0   | 0   | 1   | 3                   | 3                      |
| 0   | 1   | 1   | 0   | 4                   | 3                      |

The above truth table implements a 4-level coding scheme (e.g., PAM-4) where each symbol is represented by one of four distinct VCSEL current levels. Each symbol can thus take on four different values, corresponding to four different combinations of the values of two, binary bit streams (in differential signals D0 and D1). The table also shows that the external current, used by the driver circuit, remains constant for all four symbols.

It can be seen that the circuitry in FIG. 2 is not only compact, but also easily scalable to more than 4-level coding, by simply adding a set of two transistors and current generator, in parallel with the existing two sets shown in the figure. For instance, in PAM-8 coding, a single additional differential signal (e.g., D2+, D2−) can be specified, to deliver further transmit data in a further bit stream. The value of the divertible current for that bit stream may be 4I, and the bias transistor 206 could be designed to source 9I. This will yield eight different, equally spaced current levels, to drive the VCSEL. Other relationships, including non-integer relationships between the divertible currents and the current sourced by the bias transistor 206, are possible.

Figure 3:
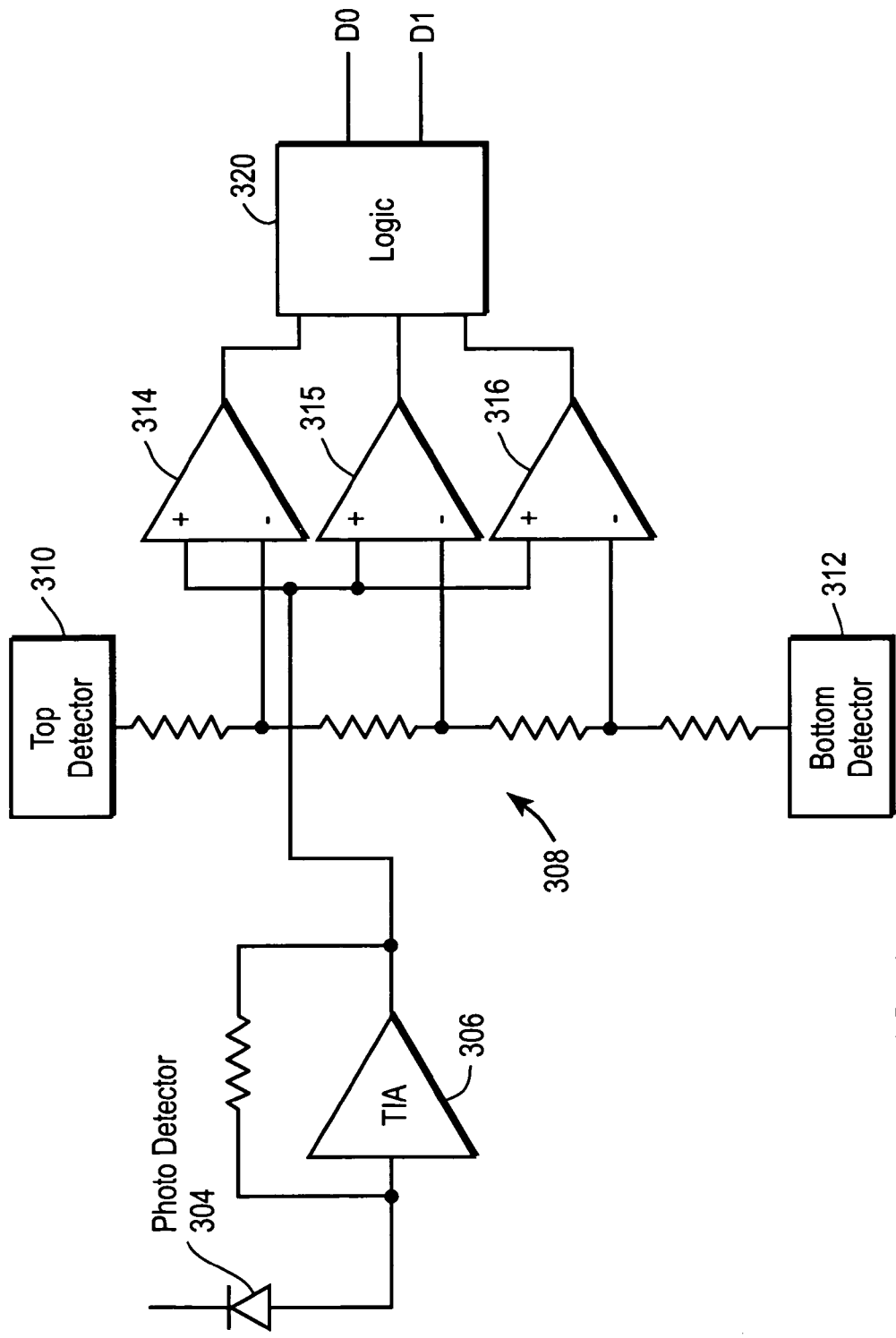
FIG. 3 is an example circuit diagram of multi-level receiver circuitry for the optical link.

Turning now to FIG. 3, an example circuit diagram of multi-level receiver circuitry for an optical link is shown. An optical or photo detector 304 is to interface with an optical waveguide, such as a fiber optic cable (not shown), to detect a received light signal. Receiver circuitry includes a transimpedance amplifier (TIA) 306 that is coupled in front of a window detector. The window detector includes a resistive ladder network 308, a top detector 310, and a bottom detector 312. The top and bottom detectors 310, 312 together set a number of thresholds (in this example, three threshold voltages) of the window detector. These thresholds are inputs to their respective comparators 314-316, each of which is to receive at its other input a voltage signal from the output of the TIA 306. In this case, namely a PAM-4 link, the window detector has three outputs that are translated by logic 320 into two binary bit streams carried by binary signals D0 and D1.

The top detector 310 determines and tracks the highest level of voltage from the output of the TIA 306. This voltage level is representative of the highest level of light intensity incident on the photo detector 304. Correspondingly, the bottom detector 312 determines and tracks the lowest level of voltage from the output of the TIA 306, which is representative of the lowest level of light intensity incident on the photo detector 304. The lowest level of light intensity is generally nonzero. The voltage range between the top and bottom detectors 310, 312 represents the range of light intensity present in the multi-level encoded symbols. The resistive ladder network 308 divides the voltage range into thresholds which are presented to the comparators 314-316, upon which the comparator scan determine the level of the voltage in the incoming signal.

Figure 4:
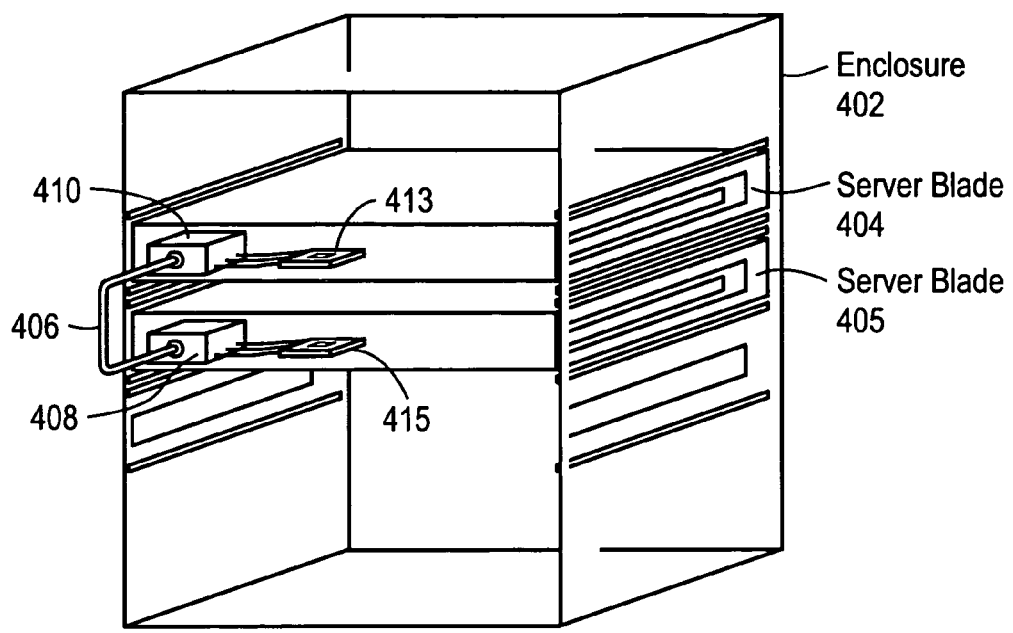
FIG. 4 is a diagram of a computer system that uses multi-level coding circuitry for optical data communications.

Referring now to FIG. 4, a conceptual diagram of a computer system that uses multi-level coding circuitry for optical data communications is shown. This is one example of a system application of the multi-level coding scheme described above. The computer system has an enclosure 402 (e.g., a computing or telecommunications rack or chassis) in which a number of server blades 404 can be inserted. The server blades 404, 405 can communicate with each other, as nodes of a local area network, for example, over an optical point-to-point data bus 406. The bus 406 may be part of an optical back plane link and may include an optical fiber cable whose ends are communicatively coupled to optical transceiver modules 408, 410 that are part of their respective server blades 404, 405. Each server blade 404, 405 also has a data processing element 413, 415 that is coupled to the optical bus 406 by its respective transceiver module 410, 408. The data processing element 413, 415 may be an I/O hub integrated circuit, which may be integrated with a central processing unit (CPU) of the server blade, or may be connected to the CPU externally. The data processing element 413, 415 has a bus interface that sends and receives one or more bit streams to and from its respective transceiver module 410, 408. The transceiver module 410, 408 may include an optical data communication circuit as described above in connection with FIGS. 1-3, to implement multi-level coded optical communications between the server blades.

Figure 5:
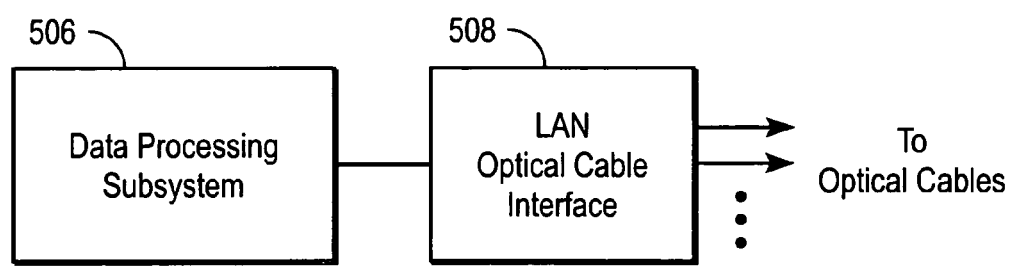
FIG. 5 is a block diagram of a data routing device that includes multi-level coding circuitry for optical links.

FIG. 5 shows another system application of a multi-level coding scheme described above, in the form of a data routing device. The data routing device may be a switch or a router that can process and forward data packets. As an alternative, the device may be one that passes time division multiplexed (TDM) signals. The data routing device has a data processing subsystem 506 that may have a CPU and memory that are programmed to process data traffic that is routed by the device. Incoming and outgoing data traffic are via optical cables (not shown) that are connected to a local area network (LAN) optical cable interface 508 of the routing device. The interface 508 is designed for LAN optical cables which are used in short distance optical links, in contrast to long distance or long-haul optical cables such as those typically used by telecommunication companies and long-haul fiber optic networks. In addition to the multi-level coding circuitry described above, the interface 508 may also include an integrated, LAN optical cable connector (that mates with one attached to the optical cable), and serializer-deserializer circuitry that serializes packets from the data processing subsystem 506 for transmission, and deserializes a received bit stream from the optical cables into, for example, multiple byte words in the format of the data processing subsystem 506. The data processing subsystem 506 operates on such packets to determine, for example, a destination node to which the packet will be forwarded, using a routing algorithm, for example, and/or a routing table.

Other system applications of the multi-level coding circuitry include usage in an interface to an optical interconnect bus that may replace a copper, chip-to-chip interconnect of a desktop or notebook personal computer system.

The invention is not limited to the specific embodiments described above. For instance, regarding the system in FIG. 4 which has a data processing element coupled to an optical bus via a transceiver module, the driver circuit portion of the transceiver module may be integrated with the data processing element (e.g., on chip with an I/O hub). Also, although the transistors in the schematic of FIG. 2 are depicted as bipolar junction devices, devices from other microelectronic technologies can alternatively be used (e.g., complementary metal oxide semiconductor, CMOS, devices). Accordingly, other embodiments are within the scope of the claims.

What is claimed is:

1. An optical data communication circuit comprising:
   an optical waveguide transmitter; and
   a driver circuit coupled to the optical waveguide transmitter, the driver circuit to receive transmit data in first and second bit streams, the driver circuit having a current generator coupled in series with the transmitter to set a baseline current that determines the highest level of light output from the transmitter, and a current robbing circuit coupled to the transmitter, the current robbing circuit to divert first and second amounts of current from the transmitter in accordance with predetermined values of the first and second bit streams, respectively.

2. The optical data communication circuit of claim 1 wherein the driver circuit is to receive further transmit data in a third bit stream, the current robbing circuit to divert a third amount of current from the transmitter in accordance with a predetermined value of the third bit stream.

3. The optical data communication circuit of claim 1 wherein the optical waveguide transmitter comprises a directly modulated laser.

4. The optical data communication circuit of claim 1 wherein the driver circuit is to drive the transmitter with a 4-level coded current signal in which each symbol is represented by a single one of four different current levels.

5. The optical data communication circuit of claim 1 wherein the current robbing circuit comprises:
   a first current generator to produce the first amount of current;
   a second current generator to produce the second amount of current;
   a first switchable path to conduct the first amount of current from the transmitter to the first current generator;
   a second switchable path to conduct the second amount of current from the transmitter to the second current generator; and
   wherein the first and second switchable paths are to be controlled by first and second differential signals that carry the first and second bit streams, respectively.

6. A computer system comprising:
   an electronic equipment enclosure;
   an optical point to point data bus;
   first and second data processing elements installed in the enclosure, the first and second data processing elements being coupled to different ends of the optical point to point data bus; and
   each of the data processing elements being coupled to its end of the point to point bus by a respective driver circuit that is coupled to an optical waveguide transmitter, the driver circuit to drive the transmitter with a multi-level coded current signal in which each symbol to be transmitted is represented by any one of three or more different signal levels, the driver circuit having a current generator coupled in series with the transmitter to set a baseline current that determines the highest level of light output from the transmitter, and a current robbing circuit coupled to the transmitter, the current robbing circuit to divert first and second amounts of current from the transmitter in accordance with predetermined values of first and second bit streams, respectively.

7. The computer system of claim 6 wherein the optical bus comprises one or more multi-mode optical fiber lines, and the optical transmitter comprises a directly modulated laser.

8. The computer system of claim 6 wherein the transmitter comprises a directly modulated laser.

9. A data routing device comprising:
   a data processing subsystem to process data traffic routed by the device; and
   a local area network (LAN) optical cable interface coupled to the data processing subsystem, the interface having a driver circuit coupled to an optical cable transmitter, the driver circuit to drive the transmitter with a multi-level coded current signal in which each symbol to be transmitted is represented by any one of three or more signal levels, the driver circuit having a current generator coupled in series with the transmitter to set a baseline current that determines the highest level of light output from the transmitter, and a current robbing circuit coupled to the transmitter, the current robbing circuit to divert first and second amounts of current from the transmitter in accordance with predetermined values of first and second bit streams, respectively.

10. The data routing device of claim 9 wherein the optical cable transmitter comprises a directly modulated laser.

* * * * *

UNITED STATES PATENT AND TRADEMARK OFFICE
CERTIFICATE OF CORRECTION

PATENT NO. : 7,613,400 B2
APPLICATION NO. : 11/480671
DATED : November 3, 2009
INVENTOR(S) : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this

Nineteenth Day of October, 2010

David J. Kappos
*Director of the United States Patent and Trademark Office*